March 14, 1950        A. D. GOODWIN        2,500,675

NUT CRACKING AND SHELLING MACHINE

Filed April 8, 1947        2 Sheets-Sheet 1

INVENTOR
A. D. Goodwin
BY
ATTORNEYS

March 14, 1950     A. D. GOODWIN     2,500,675
NUT CRACKING AND SHELLING MACHINE
Filed April 8, 1947     2 Sheets-Sheet 2
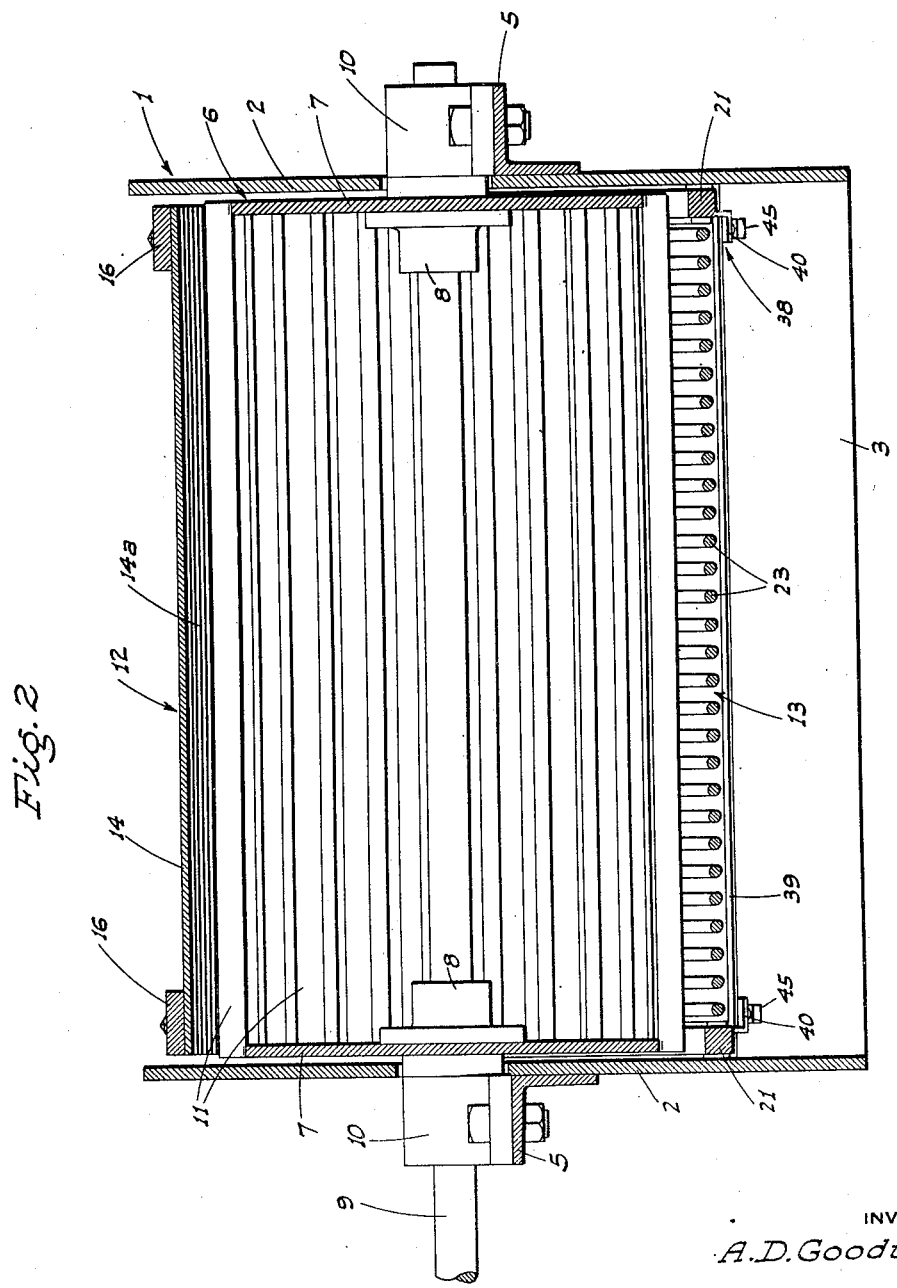
INVENTOR
A. D. Goodwin
BY
ATTORNEYS Patented Mar. 14, 1950

2,500,675

UNITED STATES PATENT OFFICE 2,500,675

NUT CRACKING AND SHELLING MACHINE

Alfred D. Goodwin, Manteca, Calif.

Application April 8, 1947, Serial No. 740,165

2 Claims. (Cl. 146—11)

This invention is directed to, and it is an object to provide, an improved nut cracking and shelling machine adapted especially for use with almonds.

The present invention represents improvements over the machine shown in my U. S. Patent No. 2,324,382, dated July 13, 1943.

Another object of the invention is to provide, in a nut cracking and shelling machine of the type described, which includes a cracking rotor, a cracking plate unit, and a grate unit; all of improved design and function, looking toward ready and effective cracking and shelling of nuts with minimum of nut meat breakage.

An additional object is to provide a machine, as in the preceding paragraph, in which the rotor includes new type cracking bars; the cracking plate unit has a center section removable for replacement or repair; both the cracking plate unit and grate unit are mounted for adjustment relative to the rotor as is very beneficial; and said grate unit is mounted in novel manner for ready removal when necessary.

A further object of the invention is to provide a nut cracking and shelling machine which includes a novel, reciprocating wiper unit cooperating with the grate unit to prevent jamming or overloading at the lead end of said unit.

A further object of the invention is to produce a relatively simple, practical, and convenient device and one which will be exceedingly effective for the purpose for which it is designed.

These objects are accomplished by means of such structure and relative arrangement of parts as will fully appear by a perusal of the following specification and claims.

In the drawings:

Figure 2 is a transverse section on line 2—2 of Fig. 1.

Figure 1:
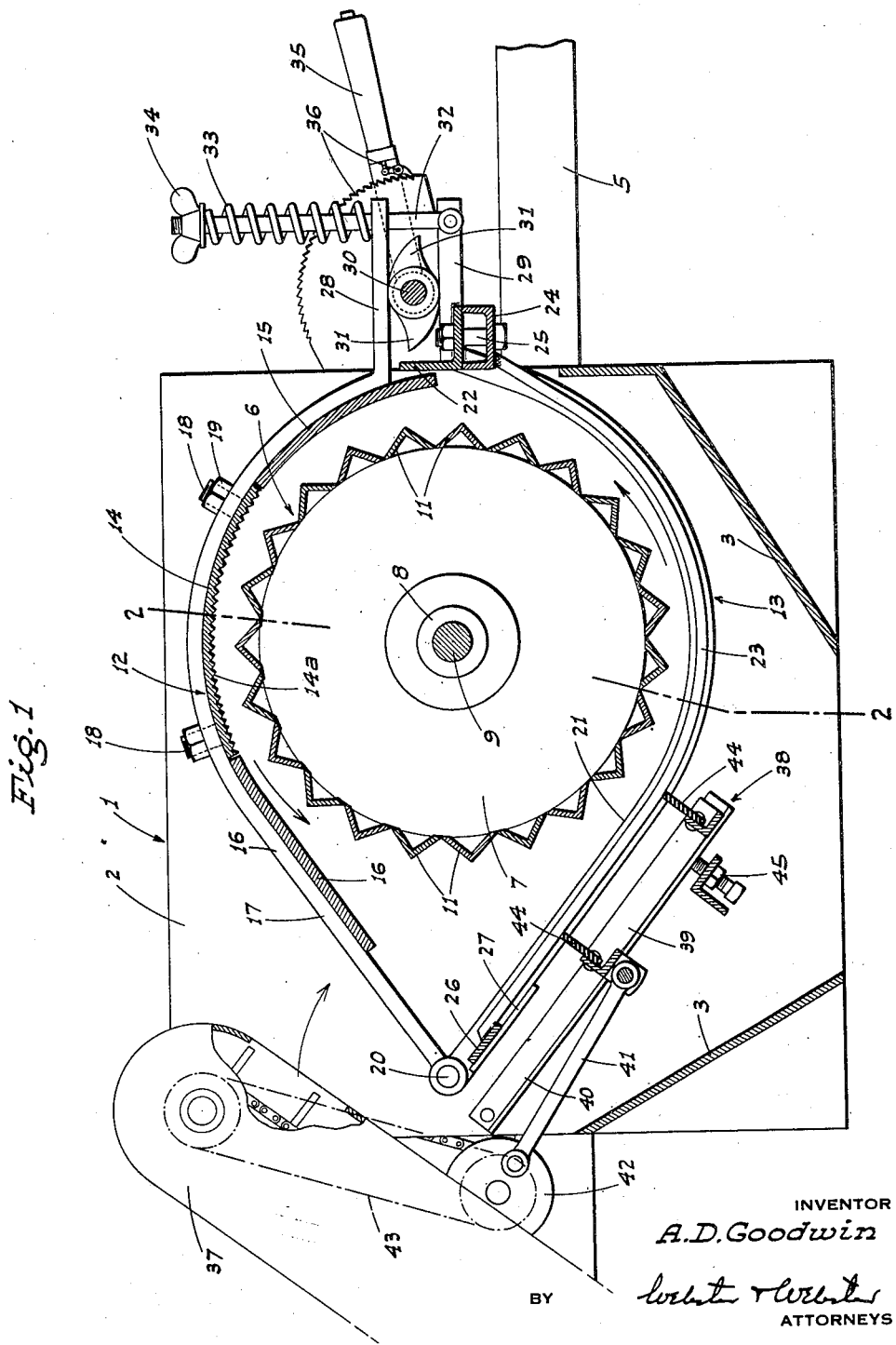
Figure 1 is a sectional elevation of the improved nut cracking and shelling machine.

Referring now more particularly to the characters of reference on the drawings, the machine comprises an upstanding housing, indicated generally at 1, including spaced apart parallel side walls 2; the latter being connected at their bottom portions by end walls 3 which form a hopper 4. The housing 1 is rigidly supported between a pair of horizontal frame beams 5.

A cracking rotor, indicated generally at 6, extends horizontally between the side walls 2 of housing 1; said cracking rotor 6 including circular end discs 7 having hubs 8 fixed on a central shaft 9 which in turn is carried adjacent but outwardly of the side walls 2 by bearings 10 supported on the horizontal frame beams 5.

The periphery or working surface of the cracking rotor 6 is corrugated with the corrugations extending lengthwise of the rotor and being sharp pointed, as shown. This working surface of the rotor is formed by a multiplicity of cracking bars 11 of angle iron configuration secured to the end discs 7 with the apex of said bars radially outermost.

The cracking rotor 6 is driven in the direction indicated by the arrows in Fig. 1 by suitable drive means applied to the shaft 9 outwardly of the housing 1.

Within said housing 1, and between the side walls 2 thereof, the machine includes, in cooperative relation to the cracking rotor 6, an arcuate cracking plate unit, indicated generally at 12, extending over said rotor, and an arcuate grate unit, indicated generally at 13, extending beneath said rotor.

The arcuate cracking plate unit 12 is concave on the side adjacent the rotor 6 and is formed on a somewhat larger radius than the rotor whereby the intermediate portion or section of said cracking plate unit is spaced from the rotor at the top of the same a distance less than the minor width of an almond, but at its end portions or sections said unit 12 is spaced from the rotor a distance greater than the major width of an almond. The central section of the cracking plate unit 12 is a removable center plate 14 transversely serrated as shown, while the opposite end sections of the unit 12 are solid, relatively smooth end plates 15 and 16, respectively. The removable center plate 14 and permanent end plates 15 and 16 are supported in their respective positions by end straps 17 which follow the configuration of the cracking plate unit and are included therein; the removable center plate 14 being secured to the straps 17 by studs 18 and nuts 19.

At one end the straps 17 are extended some distance and pivotally connected to a cross shaft 20 extending between the side walls 2, and in this manner the arcuate cracking plate unit 12 is mounted for vertical adjustment relative to the rotor 6 in the manner hereinafter described.

The arcuate grate unit, as indicated generally at 13, corresponds to the shape of the cracking plate unit 12 but is upwardly concave and works in cooperation with the bottom portion of said rotor 6. The grate unit 13 includes side bars 21 pivoted at one end on the cross shaft 20 for vertical swinging adjustment and affixed to their opposite ends to a cross beam 22. The grate portion of the unit 13 includes a plurality of transversely spaced arcuate grate bars 23 secured at one end to a cross bar 24 removably attached to the cross beam 22 by bolts 25. At the opposite ends the grate bars 23 are connected by a cross bar 26 which detachably rests on guides 27 affixed to the corresponding or adjacent parts of the side bars 21. It will thus be seen that by detachment of the cross bar 24 and the sliding of the cross bar 26 off the guides 27 that the entire grate unit 13 may be easily and readily removed from the machine, as may be necessary for cleaning, repair or replacement of another grate unit having a different spacing between the grate bars.

As with the arcuate cracking plate unit 12, the arcuate grate unit 13 approaches the rotor 6 relatively closely at the center portion of said unit 13, whereas end portions of the latter are spaced a relatively greater distance from said rotor.

The cracking plate unit 12 and the grate unit 13 are adapted to be simultaneously vertically adjusted toward or away from the rotor 6 by means of the following control mechanism:

At the ends opposite the cross shaft 20 the straps 17 of the unit 12 and the side bars 21 of the unit 13 are formed with substantially horizontal outwardly projecting fingers, indicated at 28 and 29, respectively. The pairs of adjacent and corresponding fingers 28 and 29 straddle a horizontal cross shaft 30 having fixed thereon between each such pair of fingers a double ended cam 31.

Said pairs of fingers 28 and 29 are normally urged toward each other by means of a guide rod 32 pivoted on the fingers 29 of each pair and slidably projecting through the finger 28 of such pair, extending vertically above the latter. A compression spring 33 surrounds each rod 32 above the corresponding fingers 28 and such spring is held under compression by a hand nut 32 threaded on the upper end of the rod.

At one end the cross shaft 30 is fitted with a radial hand lever 35 adapted to be held in adjusted position by a pawl and quadrant unit 36.

The cross beam 22 is fixedly secured to the fingers 29 whereby vertical adjustment of said fingers is reflected in corresponding adjustment of the cross beam 22, cross bar 24, and grate bars 23.

By manipulation of the hand lever 35 in one direction the double ended cams are rotated in a manner to engage and cause relative separation of the corresponding pairs of fingers 28 and 29. When this occurs there is a corresponding upward adjustment of the cracking plate unit 12 and simultaneously a proportionate downward adjustment of the grate unit 13. Obviously, manipulation of the lever 35 in an opposite direction causes the units 12 and 13 to adjust toward, rather than away from, the rotor 6. In this manner a nicety of adjustment of the cracking plate unit 12 and grate unit 13 can be accomplished by the operator as working conditions may require.

In operation of the above described nut cracking and shelling machine, the nuts are fed by a bottom feed type elevator 37 onto the grate unit 13 from between the cross shaft 20 and end plate 16. With the rotor 6 traveling in the indicated direction the nuts are swept along the grate unit 13 and thence carried upwardly into engagement with the cracking plate unit 12. By reason of the gradual restriction between the cracking plate unit 12 and the rotor 6 in the direction of rotation the nuts are effectively yet gently brought to the center plate 14 whence the cracking of the shells of such nuts takes place against said plate 14; the cracked nuts being gradually released, by reason of the relative separation of the end plate 16 from the rotor 6, to fall in cracked condition onto the grate bars 23. The cracked nuts traveling with the uncracked ones are worked along the grate unit 13; the shell pieces and meats of said cracked nuts separating and falling between the grate bars 23 into the hopper 4 for recovery and further processing.

By reason of the particular transverse corrugations, in cooperation with the serrated center plate 14, few nuts can pass between the rotor 6 and cracking plate 12 without at least being initially cracked.

For the purpose of preventing cracked shells, etc. from jamming between the grate bars 23 along the portions thereof between the cross shaft 20 and the rotor 6, there is provided a reciprocating wiper unit, indicated generally at 38, constructed as follows:

A reciprocating frame 39 is carried on tracks 40 on the side walls 2 below but generally parallel to the identified portion of the grate bars 23. The frame 39 is reciprocated by a connecting rod 41 driven by an eccentric drive unit 42; the latter deriving its motion from the elevator 37 by means of an endless drive arrangement 43. The reciprocating frame 39 includes a plurality of upstanding wipers 44 which work between the grate bars 23 to prevent any jamming or congestion of material therebetween. The tracks 40 are pivotally mounted, as shown, and are vertically adjustable by supporting bolts 45 whereby to regulate the extent of projection of the wipers 44 between the grate bars 23. It should be noted that the arrangement of the reciprocating wiper unit 38 is such that it does not interfere with the ready removal of the grate unit 13 when necessary.

The herein described nut cracking and shelling machine provides a very practical and improved machine for the purpose, having substantial capacity yet cracking and shelling nuts with a minimum of meat breakage.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A nut cracking and shelling machine comprising, in a supporting housing, a horizontal axis rotor having cracking elements on the periphery thereof, a concave cracking unit extending in cooperative relation over the rotor, a concave grate unit extending in cooperative relation under the rotor, means mounting the cracking unit and grate unit for vertical adjustment relative to the rotor, and means operative to effect such adjustment; said last named means including fingers projecting from one end of the cracking unit and grate unit, said fingers being vertically spaced, and a manually controlled mechanism operative to urge the fingers apart in opposite vertical directions to substantially equal but selective extent; said mechanism including a cross shaft fixed for rotation between said fingers, and a double ended cam on the shaft in engagement with the fingers, such cam having the same throw at both ends.

2. A nut cracking and shelling machine comprising a supporting housing, a rotor mounted in the housing, a concave cracking unit extending in cooperative relation to the rotor above the same, a concave grate unit extending in cooperative relation to the rotor below the same, the forward ends of the cracking unit and the grate unit extending to a point ahead of the rotor and both being pivoted at said point upon a common axis, a rearwardly projecting finger on the rear end of the cracking unit, a rearwardly projecting finger on the grate unit and spaced from the finger on the cracking unit, a shaft projecting through the space between the fingers, a double ended cam fixed to the shaft, one end of the cam moving into contact with one finger upon rotation of the shaft and the other end of the cam moving simultaneously into contact with the other finger whereby to simultaneously adjust the cracking unit and the grate unit relative to the rotor and to the same relative degree, and means to feed nuts to the housing between the forward ends of the cracking unit and grate unit.

ALFRED D. GOODWIN.

REFERENCES CITED

The following references are of record in the file of this patent:

UNITED STATES PATENTS

| Number | Name | Date |
| --- | --- | --- |
| 567,117 | Campbell et al. | Sept. 1, 1896 |
| 784,584 | Myers | Mar. 14, 1905 |
| 797,499 | Cornwall | Aug. 15, 1905 |
| 1,564,914 | Vaughan | Dec. 8, 1925 |
| 1,566,779 | Stephen | Dec. 22, 1925 |
| 2,233,824 | Domelen et al. | Mar. 4, 1941 |
| 2,234,078 | Hunt | Mar. 4, 1941 |
| 2,324,382 | Goodwin | July 13, 1943 |